March 27, 1956
L. W. WIGHTMAN
2,740,073
MACHINE SUPPORT
Filed June 3, 1952
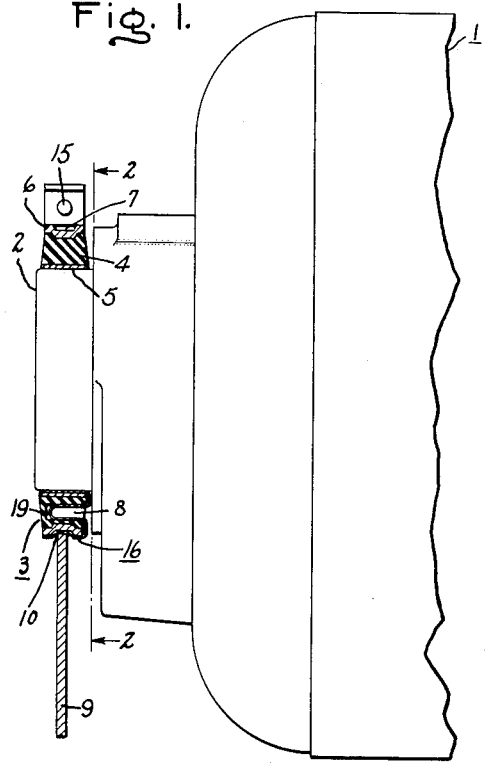
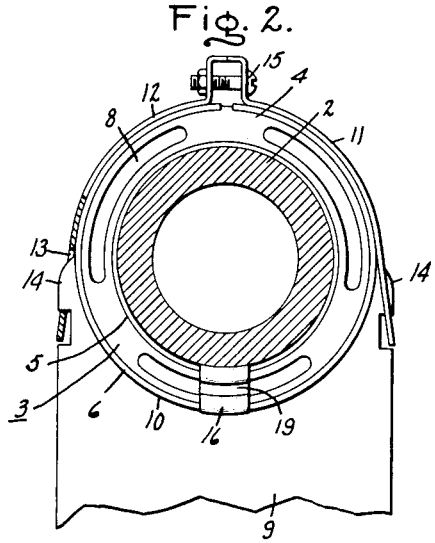
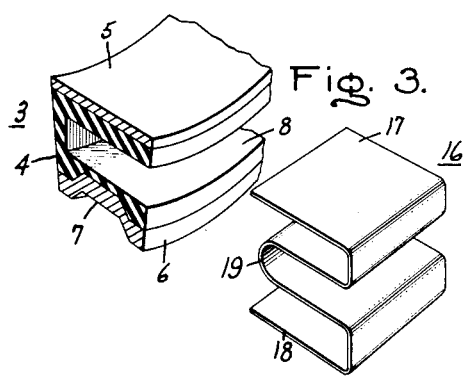
Inventor:
Lawrance W. Wightman,
by Orwell J. Mack
His Attorney.

United States Patent Office 2,740,073
Patented Mar. 27, 1956

2,740,073

MACHINE SUPPORT

Lawrance W. Wightman, Fort Wayne, Ind., assignor to General Electric Company, a corporation of New York Application June 3, 1952, Serial No. 291,383

3 Claims. (Cl. 317—2)

This invention relates to supports for rotating machines and more particularly to supports of the resilient type.

Resilient mountings of the type disclosed in Patent 2,074,137 to A. F. Welch, assigned to the assignee of the present application, are frequently used for mounting dynamoelectric machines, particularly in the fractional horsepower frame sizes. This type of resilient mounting utilizes an annulus of resilient material mounted on each bearing hub of the machine, with a generally U-shaped base or cradle having its ends respectively engaging each annulus. Clamping means engage each annulus and the cradle in order to secure the machine to the base. The resilient annulus or ring may be of the type shown in Fig. 4 of the Welch patent wherein an outer split metallic band is bonded to the outer surface, and an inner split metallic band is bonded to the inner surface. The ring may be further provided with a plurality of cutout portions in its axial face as shown in Patent 2,178,077 to H. J. Loftis.

It is required that many machines, particularly motors, have their casing or frame structure electrically connected to a ground. Therefore, when a machine, for example a fractional horsepower motor, is mounted by means of the resilient mounting structure of the Welch Patent, it is necessary to provide a separate connection from the frame of the motor to a ground, since the resilient rings at each end of the machine will ordinarily insulate the frame from ground. In order to provide this ground, several jumper arrangements have been tried to provide a grounding connection from the bearing hub of the machine around the resilient ring to the base. It is necessary that this grounding connection be simply installed and removed to permit removal of the machine from the base, and further that the connection not transmit vibration from the machine to the base. A pigtail connection has been tried between the bearing hub and the support engaging the resilient ring, this arrangement being satisfactory insofar as vibration isolation was concerned; however, its connection to the machine was difficult since the inner bonded band of the resilient ring has a press fit over the bearing hub. A grounding strap formed of thin metal was also tried, and while this strap was easily positioned between the inner band of the resilient ring and the bearing hub, and held in place when the ring was pressed on the hub, it was found to transmit an excessive amount of vibration to the base. It is, therefore, desirable to provide a grounding connection with a resilient mounting of the type described above, which can be readily assembled and disassembled, and which will not transmit vibration from the machine to the base.

An object of this invention is, therefore, to provide an improved resilient support for rotating machinery including a grounding connection having the desirable features enumerated above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects provides a rotating machine having a bearing hub with a resilient cushion mounting ring mounted thereon and having an opening formed therein. A supporting member engages a portion of this ring and a vibration isolating grounding member has one end portion arranged between the hub and the inner surface of the ring, and its other end portion arranged between the mounting member and the outer surface of the ring, with its middle portion positioned in the ring opening. More specifically, the cushion mounting ring may be the type having an inner split metallic band bonded to the inner surface of a resilient annulus, and an outer split metallic band similarly bonded to the outer surface of the annulus. The vibration isolating grounding member is formed of a flat strip of relatively this metal in the form of a double S, with one end being arranged between the hub and the inner surface of the inner band of the cushion ring, and the other end being arranged between the outer surface of the outer band of the supporting ring and the supporting member. The center portion of the double S-shaped vibration isolating grounding member is arranged in the opening in the axial face of the resilient annulus. This member provides a complete ground between the frame of the machine and the base, and is easy to install since, being formed of relatively thin metal, it can be readily positioned between the inner band of the cushion ring and the bearing hub, when the ring is pressed onto the hub. The vibration isolation is provided by this member by virtue of its double S-shaped configuration which provides a torsional spring section.

In the drawing, Fig. 1 is a fragmentary side elevational view, partly in section, illustrating the improved resilient mounting of this invention; Fig. 2 is a fragmentary cross-sectional view taken along the line 2—2 of Fig. 1; and Fig. 3 is another fragmentary view in perspective illustrating the configuration of the improved vibration isolating grounding member of this invention and its relationship with the cushion ring.

Referring now to Fig. 1, there is shown a rotating machine 1, such as a fractional horsepower motor, having a cylindrical bearing hub 2. In order to support the machine 1, a cushion mounting ring 3 is mounted on the hub 2 and comprises an annulus 4 formed of suitable resilient material, such as rubber or neoprene, with an inner split metallic band 5 bonded to the inner surface of the ring 4 and an outer split metallic band 6 bonded to the outer surface of the ring 4. The outer ring 6 has an annular groove 7 formed in its outer surface as will be hereinafter described. A plurality of semi-circular recesses or cutout portions 8 are formed in the axial face of the resilient annulus 4. The resilient cushion ring 3 is in turn supported by a supporting member 9 having an arcuate end portion 10 seated in the annular groove 7 of the outer band 6. A pair of straps 11 and 12 having suitable openings 13 formed in their ends engage latches 14 formed on the mounting member 9 and embrace the cushion ring 3 in order to secure the machine to the mounting. The clamping straps 11 and 12 are tightened in order to provide a secure assembly by means of a suitable screw 15.

In order to provide for grounding the frame of the machine 1 to the mounting 9, a double S-shaped vibration isolating and grounding member 16 is provided formed of a strip of relatively thin metal. The leg 17 of the grounding member 16 is positioned between the outer surface of the bearing hub and the inner surface of the inner band 5 of the cushion ring 3, while the other leg 18 is positioned between the outer band 6 of the cushion ring 3 and the cooperating engaging portion 10 of the mounting member 9, conforming to the configuration of the annular groove 7 in the outer band 6, by virtue of its fabrication from relatively thin metal. The central portion 19 of the grounding member 16 is fitted into one of the openings or recesses 8 as shown in Fig. 1.

It will now be readily apparent that this invention provides improved resilient mounting for a rotating machine having a grounding member characterized by its ease of installation and vibration isolation.

While I have shown and described a particular embodiment of this invention, further modifications and improvements will occur to those skilled in the art. I desire it to be understood, therefore, that this invention is not limited to the form shown and I intend in the appended claims to cover all modifications which do not depart from the true spirit and scope of this invention.

What I claim as new and desire to secure by Letters Patent of the United States is:

1. A support for a rotating machine having a bearing hub comprising a cushion mounting ring adapted to be mounted on said hub; said ring comprising an annulus of resilient material having an opening formed in an axial face thereof, an inner split metallic band bonded to the interior surface of said annulus and adapted to be snugly fitted over said hub, and an outer split metallic band bonded to the outer surface of said annulus; a supporting member having an arcuate end engaging a portion of the outer surface of said outer band, clamping means engaging said support and said outer band for securing said ring to said support, and a double S-shaped vibration isolating grounding member formed of a flat strip of relatively thin metal having one end adapted to be arranged between said hub and the inner surface of said inner band and having its other end arranged between said arcuate end of said supporting member and the outer surface of said outer band, said grounding member having its center portion positioned in said annulus opening.

2. A support for a rotating machine having a bearing hub comprising a cushion mounting ring adapted to be mounted on said hub; said ring comprising an annulus of resilient material having an opening formed in an axial face thereof, an inner split metallic band bonded to the interior surface of said annulus and adapted to be snugly fitted over said hub, and an outer split metallic band bonded to the outer surface of said annulus; a supporting assembly including a member having an arcuate end engaging a portion of the outer surface of said outer band, and clamping means engaging said member and said outer band for securing said ring to said supporting assembly, and a double S-shaped vibration isolating grounding member formed of a flat strip of relatively thin metal having one end adapted to be arranged between said hub and the inner surface of said inner band and having its other end arranged between said supporting assembly and the outer surface of said outer band, said grounding member having its center portion positioned in said annulus opening.

3. In a rotating machine having a bearing hub and a supporting member positioned beneath said bearing hub and separated therefrom by a resilient annulus having an annular opening formed in an axial face thereof, improved grounding and vibration isolating means comprising a double S-shaped member formed of a flat strip of relatively thin metal having one end adapted to be arranged between said hub and the inner surface of said annulus and having its other end adapted to be arranged between said supporting member and the outer surface of said annulus, said double S-shaped member having its center portion adapted to be positioned in said annular opening.

References Cited in the file of this patent

UNITED STATES PATENTS

| | | |
|---|---|---|
| 2,047,838 | Smith | July 14, 1936 |
| 2,104,800 | Grandy | Jan. 11, 1938 |
| 2,291,623 | Hanson | Aug. 4, 1942 |
| 2,296,221 | Pontis | Sept. 15, 1942 |
| 2,583,189 | Shewmon | Jan. 22, 1952 |

OTHER REFERENCES

Wightman: Abstract 58,264, July 8, 1952; filed November 4, 1948.